United States Patent [19]
Wopschall

[11] 3,760,766
[45] Sept. 25, 1973

[54] INDICATING DEVICE

[76] Inventor: Paul R. Wopschall, 11 N. Fifth Ave., Arcadia, Calif. 91106

[22] Filed: Nov. 21, 1972

[21] Appl. No.: 308,487

[52] U.S. Cl............ 116/135, 33/138, 116/119, 242/84.8
[51] Int. Cl............................................ G09f 5/00
[58] Field of Search............. 116/119, 130, 135; 33/138, 1, 27; 242/84.8

[56] References Cited
UNITED STATES PATENTS

| | | | |
|---|---|---|---|
| 2,070,431 | 2/1937 | Hoppmann | 116/130 |
| 2,695,454 | 11/1954 | Dart | 33/138 |
| 2,939,421 | 6/1960 | Durnin | 116/135 |
| 3,427,721 | 2/1969 | Moll | 33/138 X |
| 3,269,015 | 8/1966 | Barker | 33/138 X |

Primary Examiner—Louis J. Capozi
Attorney—D. Gordon Angus et al.

[57] ABSTRACT

There is disclosed an indicating device for facilitating chart reading, comprising a pair of tapes each extrudable from a tape housing, the two housings being hinged together so that they may be swung to a side by side position or to a position in which the tapes when extruded are perpendicular and intersecting each other. Placing the tape intersection at markings of the chart facilitates reading of the items at the vertical or horizontal coordinates.

5 Claims, 4 Drawing Figures

PATENTED SEP 25 1973  3,760,766
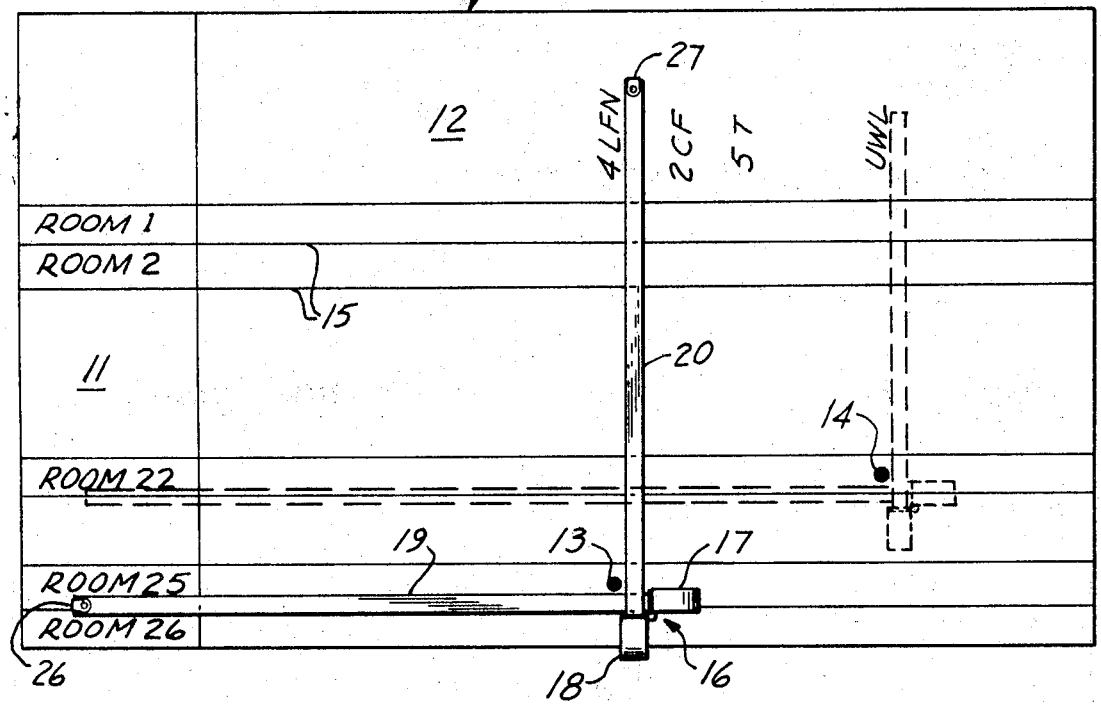
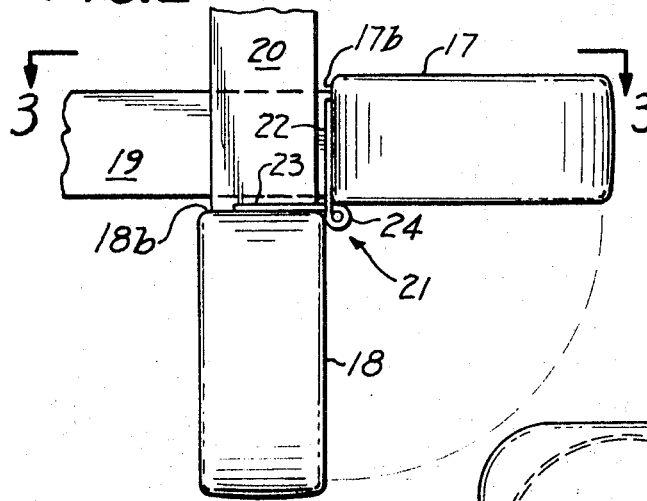
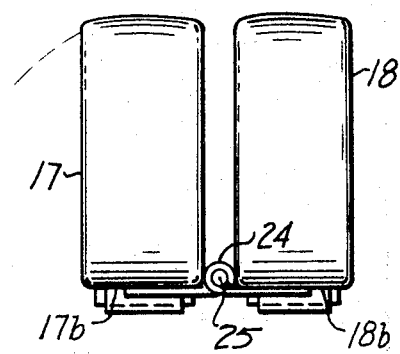
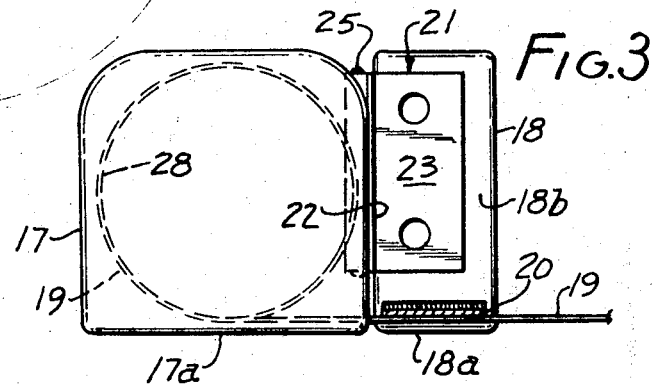

INDICATING DEVICE

This invention relates to indicating devices of a type adapted to indicate coordinates of a chart or the like and has for an object to facilitate the reading of such charts.

There are many instances where information or identifying indicia are set forth in a column usually at the left side of a sheet and other relevant indicia or information is set forth on a row on the sheet. Such a column and row may be referred to as coordinates of the chart, for example an ordinate and an abscissa. A typical instance of the use of such charts is in the building or building maintenance trades wherein it is a common practice, especially in the case of large buildings such as hotels and apartment houses and the like to provide charts showing the type of decoration or finish for respective areas or rooms or the like.

To correlate an item in the column with the corresponding item in the row it is a common practice to place a mark on the chart which is at the same horizontal level as the item in the column and vertically beneath the item in the row. Thus, for example, where the chart represents the type of decoration or finish to be applied to respective rooms or areas of a building the mark will be placed opposite the particular room at a distance which puts the mark vertically beneath the information representing the finish or decoration, assuming the several rooms are indicated in the column and the various finishes and decorations are indicated in the row.

A problem in using large charts of this character which may contain many items in the column and row, lies in a difficulty of identifying the particular item in the column and the particular item in the row to which a particular mark pertains. In accordance with the present invention there is provided an indicating device which quickly and easily indicates the coordination of an item in a column and an item in a row.

The indicating device comprises a pair of rolled tapes, each within a housing and extractable from its housing. The two housings are attached together such that their respective tapes can be extracted in such a direction as to intersect and be perpendicular to each other. According to a preferred feature the two tape housings are attached by a hinge so that the housings can be swung on the hinge to be side by side for convenience and can be swung to the mutually perpendicular relation when desired. According to another preferred feature the hinge device is provided with a stop which stops further hinge swinging when the mutually perpendicular condition is reached.

The indicating device can be used by swinging the tape housings to the mutually perpendicular condition, extracting the two tapes for a distance and placing the intersection of the two tapes at a particular one of the marks. The lengths of the tapes should be sufficient to reach the column and the row of indicia respectively. It will not be difficult to place one of the tapes so that it is observed to be substantially parallel to an upper or lower edge of the sheet, thereby pointing to the relevant item in the column. The other tape will automatically be in a vertical position on the sheet thereby pointing to the relevant item of the row.

The foregoing and other features of the invention will be better understood from the following detailed description and the accompanying drawing of which:

FIG. 1 illustrates an indicating device according to this invention placed on a typical chart containing a column and a row of items, and markings to correlate them;

FIG. 2 is an enlarged plan view of the indicating device of FIG. 1 showing part of the extended tapes in the mutually perpendicular condition;

FIG. 3 is a view taken at line 3—3 of FIG. 2; and

FIG. 4 is a plan view of the indicating device in a folded position wherein the two tape housings are side by side.

Referring to the drawing, FIG. 1 shows a chart 10 of ordinary rectangular shape having a column 11 of items along the left edge and a row 12 of items along the upper edge. For the purpose of this example the chart is assumed to be one concerning room decorations for a building, although it will be understood that insofar as this invention is concerned the chart may relate to entirely different types of items. The items in the column 11 represent various rooms of a building, for example Room 1 to Room 26. The items in the row 12 are assumed to be code for various room finishes or decorations. Thus, the coded items 4LFN, 2CF, 5T and UWL are each assumed to signify a certain type of decoration or finish. The decoration or finish to be applied to each room is represented by a dot on the chart directly beneath the code for the decoration and at the horizontal level of the room number in column 11. Thus for example, Room 25 which is to be finished according to the code 4LFN is represented by dot 13, and the finish represented by the code UWL for Room 22 is represented by dot 14. The finishes for all the other rooms will be similarly represented by respective dots. The correlation of the respective dots with the rooms and finish codes is facilitated by use of horizontal lines 15 above and below each room number, but even with the help of these lines it is not always easy to correlate the proper dot with the proper code in the vertical direction without error. Furthermore, all charts do not even have horizontal lines 15.

The correlation is facilitated by use of a device 16 in accordance with this invention. This comprises two tape housings 17 and 18 containing respective tapes 19 and 20 of the type which roll up on respective wheels 28 or the like within its housing as indicated in dotted lines in FIG. 3. Each housing and its tape may be a conventional well-known type which is flexible in the direction which permits ready rolling and unrolling but which is provided with sufficient rigidity when withdrawn from the housing so that it will extend outward from the housing relatively straight. This may be done in a well-known manner as by giving the tape a slight bow in its transverse direction.

In the type of housing illustrated each tape housing has a substantially flat bottom 17a and 18a respectively and the tapes 19 and 20 are extracted from their housings along these bottoms. The forward facing edges 17b and 18b of the respective housings are hinged together by a hinge 21 having two flat faces 22 and 23 respectively, each provided with curled tongues 24 which curl around a hinge pin 25 in a well-known manner.

The hinge permits the tape housings to be swung to their parallel position shown in FIG. 4, for convenience of handling and storing, and to be opened to their operational position shown in FIGS. 2 and 3 at which position the forward faces 17b and 18b of the two housings are perpendicular to each other and likewise their tapes when extended, one over the other, are also perpendicular to each other. The hinge will not permit the tape housings to be swung any further from their position shown in FIG. 4 than to the position shown in FIG. 2, for the reason that at the position shown in FIG. 2 there is provided a stop. This stop exists from the fact that part of the inner edge of hinge member 23 which is not curled around the pin 25, abuts hinge member 22 at that position, as appears in FIG. 2.

To use the device the tape housings are swung to the position shown in FIG. 2 and 3 and the two tapes are extended as shown in FIG. 1 so that one tape can be placed horizontally on the chart while the other will be vertical. When the intersection of the tapes is placed at a mark such as mark 13 it will thus immediately correlate the particular room with the particular coding in row 12.

The forward ends of the tapes are preferably provided with small clips 26 and 27 so they may be readily grasped to extract them. Furthermore it will usually be desired to spring load the tape wheels or bobbins 28 of the two tapes in the direction which urges them to rotate in the direction which retracts the tapes into their housings, to facilitate the retraction.

The tapes need not be numbered to indicate dimensions for the purpose of correlating chart indicia according to FIG. 1, although dimensions in inches or fractions thereof may be useful for other purposes. The tapes should be long enough to extract to the greatest lengths required by the size of the chart.

What is claimed is:

1. A chart reading aid comprising a pair of tape housings, a tape extractable from and retractable into, each housing, hinge means attaching the housings directly to each other so that the housings may be oriented to position the respective tapes extracted from the housings in a perpendicular and intersecting relationship to each other.

2. A device according to claim 1 in which each tape may be extracted to any desired length up to that limited by the length of each tape.

3. A device according to claim 1 in which the hinge means has a stop means preventing the extracted tapes from moving past the perpendicular relationship.

4. A device according to claim 1 in which each tape is mounted on a bobbin in its housing, the bobbins being spring loaded, to urge retraction of the tapes into the housings.

5. A device according to claim 1 in which the housings have flat bottoms on which they may rest when the tapes are extracted.

* * * * *